(12) United States Patent
Krude et al.

(10) Patent No.: US 8,152,680 B2
(45) Date of Patent: Apr. 10, 2012

(54) DIFFERENTIAL ASSEMBLY WITH ASSEMBLY OPENINGS

(75) Inventors: Werner Krude, Neunkirchen-Seelscheid (DE); Ralf Leuschen, Oberbettingen (DE); Bernd Constantin, Düsseldorf (DE)

(73) Assignee: GKN Driveline International, GmbH, Lohmar (DE)

( * ) Notice: Subject to any disclaimer, the term of this patent is extended or adjusted under 35 U.S.C. 154(b) by 938 days.

(21) Appl. No.: 11/915,572

(22) PCT Filed: Feb. 4, 2006

(86) PCT No.: PCT/EP2006/000978
§ 371 (c)(1),
(2), (4) Date: Jul. 14, 2008

(87) PCT Pub. No.: WO2006/125478
PCT Pub. Date: Nov. 30, 2006

(65) Prior Publication Data
US 2009/0239698 A1    Sep. 24, 2009

(30) Foreign Application Priority Data
May 24, 2005 (DE) .......................... 10 2005 024 452

(51) Int. Cl.
*F16H 48/06* (2006.01)
(52) U.S. Cl. ...................................................... 475/230
(58) Field of Classification Search .................. 475/230, 475/236, 248
See application file for complete search history.

(56) References Cited

U.S. PATENT DOCUMENTS

| | | | |
|---|---|---|---|
| 2,283,661 A * | 5/1942 | Williamson | 475/236 |
| 5,951,431 A | 9/1999 | Downs et al. | |
| 6,811,511 B2 * | 11/2004 | Zeise | 475/248 |
| 7,582,037 B2 * | 9/2009 | Engelmann et al. | 475/227 |
| 7,658,692 B2 * | 2/2010 | Engelmann et al. | 475/221 |
| 2004/0152554 A1 | 8/2004 | Krude et al. | |
| 2005/0070394 A1 | 3/2005 | Sugeta et al. | |

FOREIGN PATENT DOCUMENTS

| | | |
|---|---|---|
| DE | 198 20 206 A1 | 11/1998 |
| DE | 101 25 793 A1 | 12/2002 |
| DE | 103 08 800 A1 | 2/2003 |
| EP | 1 433 978 A | 6/2004 |

* cited by examiner

*Primary Examiner* — Ha D. Ho
(74) *Attorney, Agent, or Firm* — Rader, Fishman & Grauer, PLLC (57) ABSTRACT

A differential assembly is described, in the form of a crown differential for use in a driveline of a motor vehicle. The differential assembly comprises a one-piece differential carrier which is rotatably drivable around an axis of rotation and, in a casing portion, comprises no more than two identical openings for mounting sideshaft gears rotatably held in the differential carrier on the axis of rotation, as well as differential gears, which rotate jointly with the differential carrier around the axis of rotation and engage the teeth of the sideshaft gears. With reference to a longitudinal central plane, the openings are arranged so as to be mirror-symmetrical and comprise an axial length corresponding at least to the diameter of the differential gears, and a greatest circumferential extension which, in a radial view, corresponds at least to the diameter of the sideshaft gears.

20 Claims, 6 Drawing Sheets

DIFFERENTIAL ASSEMBLY WITH ASSEMBLY OPENINGS

TECHNICAL FIELD

The invention relates to a differential assembly which forms part of a differential drive and, more particularly, serves to be used in the driveline of a motor vehicle.

BACKGROUND

Differential assemblies commonly comprise a differential carrier which is rotatingly drivable around an axis of rotation, two sideshaft gears which are rotatably held in the differential carrier and serve to transmit torque to two sideshafts, as well as a plurality of differential gears which jointly rotate in the differential carrier and whose teeth engage those of the sideshaft gears.

From U.S. Pat. No. 2,865,229, U.S. Pat. No. 5,620,388 and DE 100 09 961 A1 there are known differential assemblies which comprise a one-piece differential carrier with radial openings for mounting the sideshaft gears and the differential gears. In all cases, the differential assemblies are provided in the form of bevel gear differentials, with the differential gears and the sideshaft gears being provided in the form of bevel gears. As compared to the sideshaft gears, the differential gears comprise a relatively large diameter, so that the bevel gear differential, overall, comprises a relatively large length.

EP 1 433 978 A1 proposes a differential assembly in the form of a bevel gear differential with a one-piece differential carrier which comprises a total of three assembly openings, with two of the three assembly openings being provided for threading in the differential gears whereas the third opening is provided for mounting the two sideshaft gears. The third assembly opening comprises a largely pentagonal shape which is asymmetric relative to the axis of rotation to allow the sideshaft gears to be threaded in at an angle relative to the axis of rotation. Because of the angular position of the third assembly opening, the mass of the differential carrier is unevenly distributed, thus generating out-of-balance conditions. In general, the problem consists in that the assembly openings and the bores for supporting the journal clearly reduce the stiffness and strength of the differential carrier.

U.S. Pat. No. 5,951,431 shows a further differential assembly in the form of a bevel gear assembly with a one-piece differential carrier. For mounting the sideshaft gears and the differential gears, the differential carrier comprises two diametrically opposed openings which, in a radial view, are lentil-shaped. The openings comprise a long diagonal line which encloses an angle together with the longitudinal central plane of the differential assembly. This means that the sideshaft gears can be introduced through the assembly openings in a position which is angular relative to the axis of rotation.

From U.S. Pat. No. 5,234,388 there is known a differential assembly with a one-piece differential carrier. The differential carrier comprises two opposed assembly openings which, in a radial view, are substantially circular in shape and, at the flange end, comprise a flattened portion with a central concave recess.

DE 103 08 800 A1 proposes a crown gear differential with a three-part differential carrier. The sideshaft gears in the form of crown gears are mounted axially. In the central part of the differential carrier there are provided circumferentially distributed openings through which the differential gears are mounted.

SUMMARY OF THE INVENTION

The present invention to provide a one-piece differential assembly having a high degree of strength and torsional stiffness, and having a particularly compact design and a low weight.

In accordance with the invention, a differential assembly is provided in the form of a crown gear differential, for use in the driveline of a motor vehicle, comprising a one-piece differential carrier which is rotatably drivable around an axis of rotation and which, in a casing portion, comprises no more than two identical openings for mounting sideshaft gears and differential gears. The sideshaft gears are provided in the form of crown gears and, in the mounted condition in the differential carrier, are rotatably held on the axis of rotation A. The differential gears are provided in the form of spur gears and rotate jointly with the differential carrier around the axis of rotation A and engage the teeth of the sideshaft gears. With reference to the longitudinal central plane, the openings are arranged so as to be mirror-symmetric and comprise an axial length L1 which corresponds at least to the diameter of the differential gears and, in a radial view, comprise a greatest circumferential extension L2 which corresponds to at least a smallest outer diagonal line of the sideshaft gears.

Providing the differential assembly in the form of a crown gear differential is advantageous in that there is achieved a compact design and thus a low weight. Furthermore, due to the differential gears being provided as spur gears, there is obtained a short axial length of the assembly openings. By using only two openings, the webs formed in the circumferential direction between the openings extend over a relatively long distance, so that the differential carrier features a high rotational stiffness and a high strength while simultaneously featuring a small size. In order to avoid any undesirable out-of-balance, the two openings are identical and are mirror-symmetrical relative to the longitudinal central plane. In principle, it is also conceivable to provide only one single opening through which the sideshaft gears and the differential gears are introduced into the differential carrier. The differential carrier is preferably produced in one piece, more particularly in the form of a casting and comprises formed-on sleeve projections for being supported in a stationary housing. Produced "in one piece" means that, for mounting the gears, the differential carrier cannot be dismantled into several individual parts, which is the case with multi-part differential carriers. The one-piece design is advantageous in that there is achieved a high degree of stiffness and a small number of parts which has an advantageous effect on production costs.

According to one preferred embodiment, the axial length L1 of the openings at most corresponds to 1.1 times the diameter D2 of the differential gears and, in a radial view, the greatest circumferential extension L2 at most corresponds to 1.1 times the diameter D1 of the sideshaft gears. This has the advantage of achieving small assembly openings and thus a high degree of stiffness for the differential carrier. By selecting the axial length L1 of the openings in accordance with the nominal diameter D2 of the differential gears and by selecting the circumferential extension L2 of the openings in accordance with the nominal diameter D1 of the sideshaft gears, it is possible to minimize the size of the openings. The introduction of the gears is permitted by selecting suitable tolerances which can amount to approximately 3% to 5% of the nominal dimensions. On their radial outside, the sideshaft gears can comprise two opposed parallel flattened portions, so that, in a radial projection, there is achieved an outer diagonal line which is reduced in size relative to the greatest outer diameter. This means that the circumferential extension of the openings can be even smaller than the nominal diameters of the sideshaft gears. As a result, the size of the openings is minimized and the stiffness of the differential carrier is maximized.

The openings are preferably designed in such a way that the sideshaft gears can be introduced through the openings, with their respective axes being aligned so as to extend approximately parallel to the axis of rotation. Furthermore, the openings according to a preferred embodiment are designed in such a way that the differential gears can be introduced through the openings, with their respective axes being aligned approximately perpendicularly relative to the axis of rotation. With reference to the cross-sectional plane which is positioned perpendicularly on the axis of rotation, the two openings are asymmetric, as a result of which the size of the openings and thus the degree of material weakening are minimized. This has an advantageous effect on the rotational stiffness and strength of the differential carrier. The width of the openings in the circumferential direction is preferably greater than the axial length of same.

The openings may be provided in the form of a polygon, more particularly with rounded edges. To achieve a high degree of stiffness for the differential carrier it is particularly advantageous if the regions of transition are provided in the form of pentagons with rounded edges. It is advantageous to provide regions of transition between the substantially straight partial faces by means of radii in order to minimize stresses. This includes an embodiment wherein also the partial faces of the pentagon itself are formed by radii. In an embodiment of same, the pentagon comprises a base face, two side faces extending substantially parallel to the axis of rotation and two end faces extending at an angle relative to the axis of rotation. The region of transition between the end faces is formed by a first radius which preferably approximately corresponds to the radius of the differential gears or is greater than same. This means that, taking into account the production tolerances of the differential gears and of the differential carrier, the first radius is selected to be just large enough to allow the differential gears to be introduced into the openings. Furthermore, the regions of transition between the end faces and the side faces are formed by second radii which preferably approximately correspond to the radius of the differential gears or are smaller than same. It is thus achieved in an advantageous way that there is a large amount of material in the region of the end faces, which increases the stiffness of the differential carrier. The regions of transition between the side faces and the base face are formed by third radii which are preferably smaller than the second radii between the side faces and the base face. There is thus achieved a short axial length of the openings. Overall, by selecting the radii as described, the stresses in the differential carrier are minimised during the transmission of torque, which has an advantageous effect on the service life. The differential carrier comprises a flange for torque transmitting purposes, with the base faces of the two openings preferably being arranged so as to axially adjoin the flange. This arrangement is advantageous from the point of view of achieving a high degree of stiffness because the portion of the opening which is tapered due to the angled end faces is arranged in a conical differential carrier portion.

According to one preferred embodiment there are provided exactly two identical openings which are circumferentially offset relative to one another by 180°. This is advantageous from the point of view of a uniform distribution of mass and a resulting small amount of out-of-balance. The differential carrier, in the webs formed in the circumferential direction between the two openings, may comprise radial through-apertures for receiving a journal. The journal is positioned perpendicularly on the longitudinal central plane extending through the openings. There are preferably provided exactly two differential gears which are supported on a common journal which is inserted into the through-apertures. The number of parts is thus minimised, which has a positive effect on production and assembly costs. However, in principle, it is conceivable to use more than two, and more particularly four differential gears.

The assembly sequence is a follows. First, the sideshaft gear remote from the flange is inserted into the opening in the differential carrier until, in its end position, it is in contact with a contact face of the differential carrier. Subsequently, the sideshaft gear adjoining the flange is introduced into the opening and axially displaced into its end position in which it is supported against the associated contact face in the differential carrier. During the following assembly stage, the two differential gears are passed through the openings, with their teeth being made to engage the teeth of the two sideshaft gears. Then the set of gears consisting of differential gears and sideshaft gears is rotated by 90° around the axis of rotation relative to the differential carrier, so that the bores of the differential gears are aligned with the radial through-apertures in the webs. Subsequently, the journal is inserted into the radial through-apertures for the purpose of carrying the two differential gears. Finally, the differential gears are axially secured relative to the journal and the journal is axially secured relative to the differential carrier.

BRIEF DESCRIPTION OF THE DRAWINGS

FIG. 3 shows the differential assembly illustrated in FIG. 2b in a longitudinal section through the radial through-apertures.

FIGS. 6a-c show the assembly sequence of the differential assembly to illustrated in FIG. 2b:
FIG. 6a) illustrating inserting the first sideshaft gear
FIG. 6b) illustrating inserting the second sideshaft gear
FIG. 6c) illustrating inserting the differential gears.

DETAILED DESCRIPTION OF THE DRAWINGS

Figure 1:
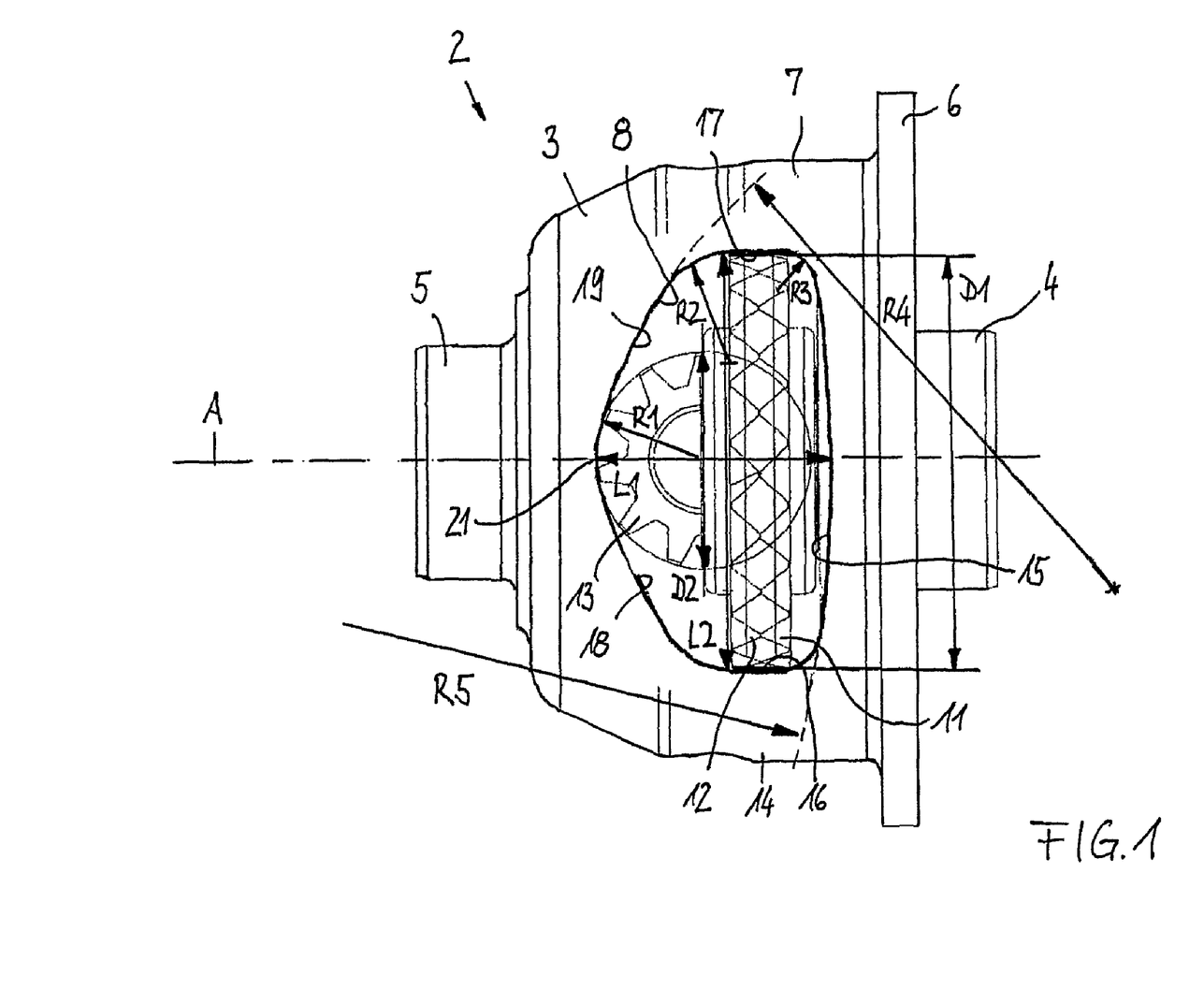
FIG. 1 is a differential assembly in accordance with the present invention, the assembly including openings with rounded side faces.
Figure 2A:
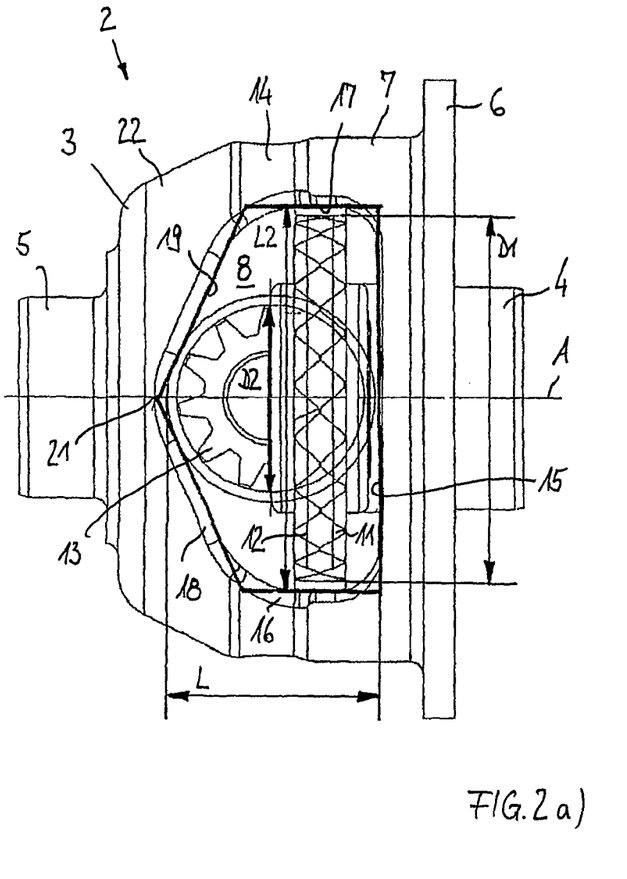
FIG. 2a shows a differential assembly in accordance with the present invention, the assembly including an opening with straight side faces, the illustration shown as a theoretical principle regarding the shape of the openings.
Figure 2B:
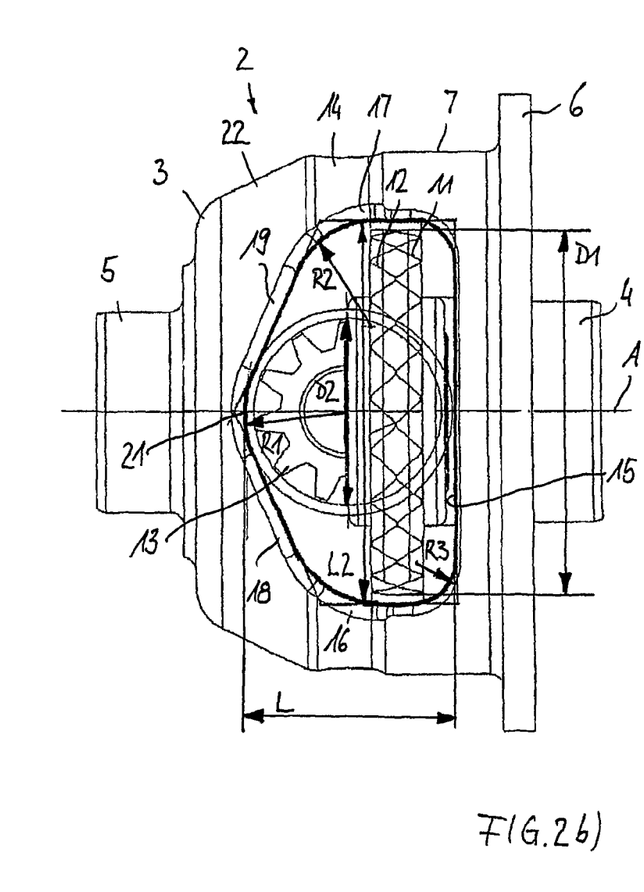
FIG. 2b shows a differential assembly in accordance with the present invention, the assembly including an opening with straight side faces, the illustration shown as a concrete embodiment.

The differential assemblies 2 as shown in FIGS. 1 and 2 largely correspond to one another in respect of their design and mode of functioning and will be described jointly below. Identical components have been given the same reference numbers. There is shown a differential assembly 2 with a one-piece differential carrier 3 which has to be supported in a stationary housing (not illustrated). For this purpose, the differential carrier 3 is provided with formed-on sleeve-shaped bearing projections 4, 5 which serve to receive rolling contact bearings (not illustrated). The differential assembly 2 forms part of a differential drive in the driveline of a motor vehicle and serves to transmit torque from a propeller shaft (not illustrated) to two sideshafts. For this purpose, the differential carrier 3 is provided with a formed-on flange 6 to which there can be secured a ring gear for introducing torque into the differential assembly 2.

The one-piece differential carrier 3 comprises a casing portion 7 in which there are arranged two radial openings 8 which are offset by 1800 around the axis of rotation A and which are provided for mounting two sideshaft gears 11, 12 and a plurality of differential gears 13. The two openings 8 of which only one is visible in the present radial view are identical. In the present case, the sideshaft gears 11, 12 and one of the differential gears 13 overlap in an imaginary position in order to illustrate the size relationships. To keep the degree of material weakening in the region of the webs 14 formed in the circumferential direction between the openings 8 as small as possible, each of the openings 8, taking into account the usual production tolerances, is just large enough to introduce the sideshaft gears 11, 12 and the differential gears 13. It can be seen that the width L2 of the opening 8 in the circumferential direction, if viewed in a radial projection, is greater than the greatest diameter D1 of the sideshaft gears 11, 12, and is preferably smaller than 1.1 times the diameter D1 of the sideshaft gears. Thus, the sideshaft gears 11, 12 can be introduced into the differential carrier 3 with their respective axes aligned so as to extend approximately parallel to the axis of rotation A without tilting laterally. Furthermore, the axial length L1 of the opening 8 is greater than the greatest diameter D2 of the differential gears 13 and preferably smaller than 1.1 times the diameter D2 of the differential gears. This makes it possible for the differential gears 13 to be introduced into the differential carrier 13 with their respective axes being aligned so as to extend approximately perpendicularly relative to the axis of rotation A without tilting.

To keep the degree of material weakening as low as possible, the opening 8 comprises an approximately pentagonal shape and forms a base face 15 which axially adjoins the flange 6, two adjoining side faces 16, 17 which extend approximately parallel to the axis of rotation, as well as two adjoining end faces 18, 19 which are positioned at an angle relative to the axis of rotation and which meet in an apex 21 positioned on the axis of rotation A. It can be seen that the opening 8 is designed mirror-symmetrically relative to the axis of rotation A. Any out-of-balance resulting from an uneven distribution of masses is thus excluded. To keep the stresses in the differential carrier 3 as low as possible when torque is transmitted, the transitions regions located between two faces are formed by the largest possible radii. It can be seen that the radius R1 connecting the two end faces 18, 19 to one another is greater than the radii of the differential gears 13. The centre of the radius R1 is positioned approximately in a cross-sectional plane through the differential gears 13, which plane extends perpendicularly to the axis of rotation. The radii R2 between the end faces 18, 19 and the side faces 16, 17, taking into account the usual tolerances, correspond at most to the radii of the differential gears 13. On the other hand, the radii R3 between the side faces 16, 17 and the base face 15 are selected to be smaller.

In the embodiment according to FIG. 1, the base face 15, the side faces 16, 17 and the end faces 18, 19 are also rounded and formed by large radii R4, R5. Thus, the stresses occurring during the transmission of torque in the differential carrier 3 are minimized. Alternatively, said faces of the embodiment according to FIGS. 2-7, in a radial view, are largely straight. This is particularly obvious in FIG. 2a) which, in a thick line, shows a mirror-symmetric pentagon which serves as a theoretical starting point for the shape of the opening 8. FIG. 2b) shows the same differential assembly wherein the actual shape of the opening 8 is characterised by a thick line. The side faces 16, 17 are inclined as a result of the conical portion 22 of the differential carrier 3.

Figure 4:
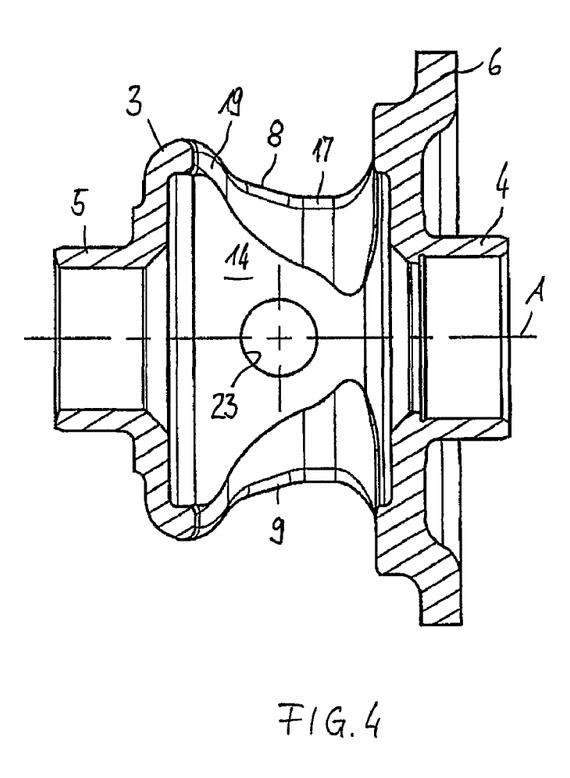
FIG. 4 shows the differential assembly illustrated in FIG. 2b in a longitudinal section through the assembly openings.
Figure 5:
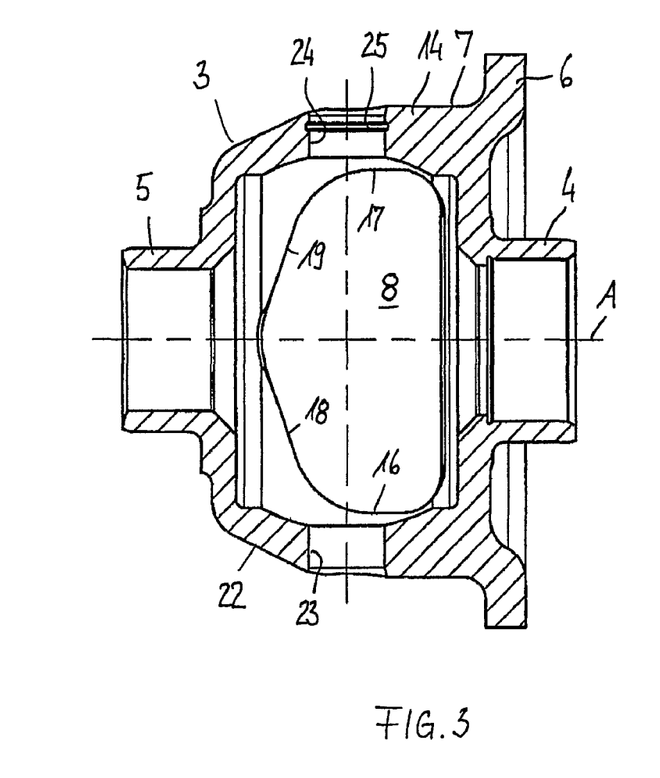
FIG. 5 shows the differential assembly illustrated in FIG. 2b in a perspective view.

FIGS. 3, 4 and 5 will be described jointly below. They show the differential carrier according to FIG. 2 to the description of which reference is hereby made. It can be seen that the webs 14 positioned in the circumferential direction between the openings 8, 9 are provided for receiving a journal (not illustrated). After the differential gears have been inserted, the journal is made to pass through said differential gears and is axially secured relative to the differential carrier by a securing ring which engages an annular groove 25 in the bore 24. The sideshafts (not shown here) are made to pass through the sleeve-shaped bearing projections and are firmly connected to the sideshaft gears.

Figure 6:
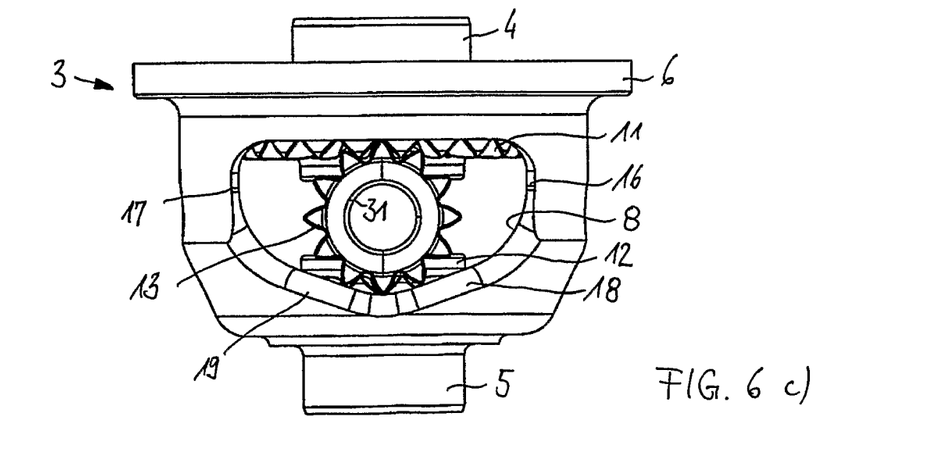
Figure 6A:
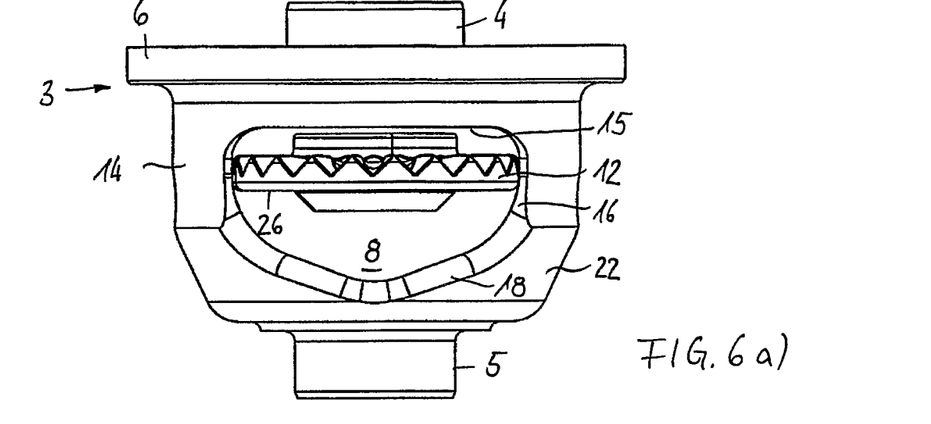
Figure 6B:
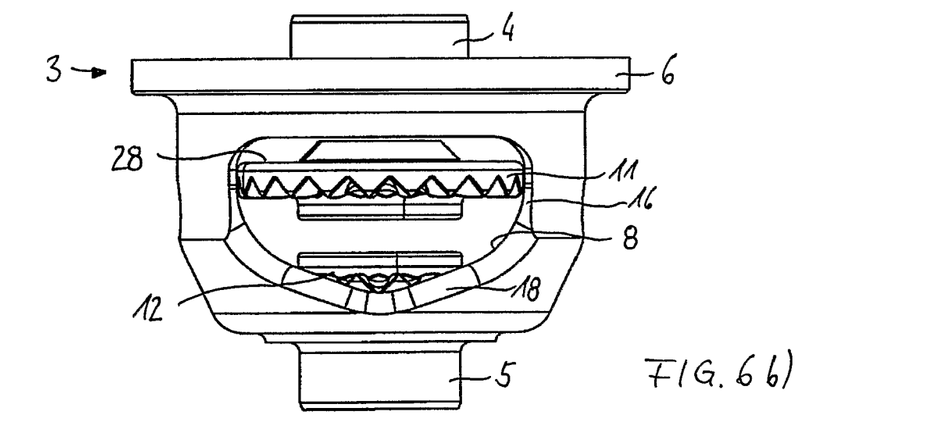
Figure 7:
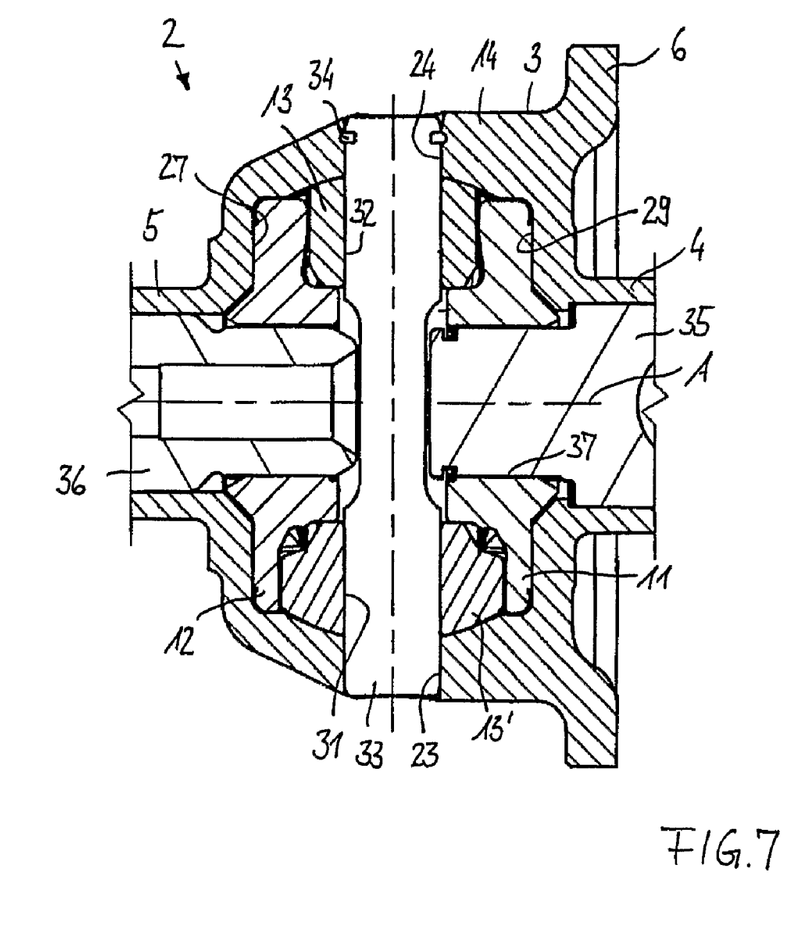
FIG. 7 shows the differential assembly illustrated in FIGS. 2-6 in a longitudinal section through the journal axis in the finish-mounted condition.

FIGS. 6 and 7 will be described jointly below. They show the assembly sequence for a differential carrier according to FIGS. 2 to 5 to the description of which reference is hereby made. As can be seen in FIG. 6a, first the sideshaft gear 12 which is remote from the flange 6 is introduced into the opening 8 and axially displaced until, by means of its radial contact face 26, it is in contact with a supporting face 27 in the differential carrier 3 or an abutment disc. Thereafter, the sideshaft gear 11 adjoining the flange is introduced into the opening 8 and, by means of its contact fact 28, made to contact a supporting face 29 in the differential carrier 3 or an abutment disc; FIG. 6b). Subsequently, the two differential gears 13 are made to pass through the opening 8 and the opening 9 in the differential carrier 3, with their teeth being made to engage the two sideshaft gears 11, 12, which is shown in FIG. 6c). During the next assembly stage, the set of differential gears 11, 12, 13 is rotated by 900 around the axis of rotation, so that the bores 31, 32 of the differential gears 13 are aligned with the radial through-apertures 23, 24 in the differential carrier. Then the journal 33 can be inserted into the bores 31, 32 and axially secured by a securing ring 34 in the differential carrier 3. The finish-assembled differential assembly 2 is shown in FIG. 7 which also shows the sideshafts 35, 36 which, which longitudinal teeth 37, 38, are connected in a rotationally fixed way to the associated sideshaft gear 11, 12. The differential assembly 2 is provided in the form of a crown gear differential wherein the sideshaft gears 11, 12, are provided in the form of crown gears and the differential gears 13 are provided in the form of spur gears. Crown gear differentials are advantageous in that they comprise a particularly short axial length.

LIST OF REFERENCE NUMBERS 2 differential assembly
3 differential carrier
4 bearing projection
5 bearing projection
6 flange
7 casing portion
8 opening
9 opening
10 -
11 sideshaft gear
12 sideshaft gear
13 differential gear
14 web 15 base face
16 side face
17 side face
18 end face
19 end face
20 -
21 apex
22 conical portion
23 through-aperture
24 through-aperture
25 annular groove
26 contact face
27 supporting face
28 contact face
29 supporting face
30 -
31 -
32 bore
33 journal
34 securing ring
35 sideshaft
36 sideshaft
37 longitudinal teeth
38 longitudinal teeth
A axis of rotation
D diameter
L length
R radius

The invention claimed is:

1. A crown gear differential assembly for use in the driveline of a motor vehicle, comprising:
a one-piece differential carrier rotatably drivable around an axis of rotation (A); said one-piece differential carrier including a casing portion comprising no more than two identical openings for mounting sideshaft gears and differential gears;
wherein said sideshaft gears are crown gears and, wherein in a mounted condition in said differential carrier, said sideshaft gears are rotatably held on said axis of rotation (A);
wherein said differential gears are spur gears and rotate jointly with said differential carrier around said axis of rotation (A) and engage the teeth of said sideshaft gears;
wherein, with reference to a longitudinal central plane, said openings are arranged so as to be mirror-symmetrical and comprise an axial length (L1) which corresponds at least to the diameter of said differential gears and, in a radial view, comprise a greatest circumferential extension (L2) which corresponds to at least a smallest outer diagonal line of said sideshaft gears.

2. A differential assembly as described in claim 1, wherein said openings are configured such that said sideshaft gears can be introduced through said openings with their respective axes being aligned so as to extend approximately parallel to said axis of rotation (A).

3. A differential assembly as described in claim 1, wherein said openings are configured such that said differential gears can be introduced through said openings with their respective axes being aligned approximately perpendicularly relative to said axis of rotation (A).

4. A differential assembly as described in claim 1, wherein said openings are configured to be asymmetric relative to a cross-sectional plane extending perpendicularly relative to Said axis of rotation (A).

5. A differential assembly as described in claim 1, wherein, in a radial view, said circumferential extension (L2) of said openings is greater than the axial length (L1) of said openings.

6. A differential assembly as described in claim 1, wherein said axial length (L1) of said openings at most corresponds to 1.1 times a diameter (D2) of the differential gears and that, in a radial view, the greatest circumferential extension (L2) at most corresponds to 1.1 times a diameter (D1) of said sideshaft gears.

7. A differential assembly as described in claim 1, wherein said openings are each designed in the shape of a polygon.

8. A differential assembly as described in claim 7, wherein said openings comprise a form of a pentagon, with rounded corners.

9. A differential assembly as described in claim 8, wherein, in a radial view, the said pentagon comprises;
a base face;
two side faces extending substantially parallel to said axis of rotation (A); and
two end faces extending at an angle relative to said axis of rotation (A).

10. A differential assembly as described in claim 1, wherein said differential carrier comprises a flange for introducing torque, with a base face being arranged so as to axially adjoin said flange.

11. A differential assembly as described in claim 9, wherein a first region of transition between said end faces is formed by a first radius (R1) which, approximately corresponds to the radius of differential gears.

12. A differential assembly as described in claim 9, wherein second regions of transition between said end faces and said side faces are formed by second radii (R2) which is smaller than or equal to the radius of said differential gears.

13. A differential assembly as described in claim 12, wherein third regions of transition between said side faces and said base face are formed by third radii (R3) which are smaller than said second radii (R2) between said side faces and said base face.

14. A differential assembly as described in claim 1, wherein said openings comprise exactly two diametrically opposed openings.

15. A differential assembly as described in claim 1, wherein, in said casing portion said differential carrier comprises radial through-apertures for receiving a journal said radial through-apertures are positioned in the circumferential direction between said two openings.

16. A differential assembly as described in claim 15, wherein said differential gears comprise exactly two differential gears supported on a common journal which is inserted into said radial through-apertures.

17. A differential assembly comprising:
a differential carrier rotatable around an axis of rotation (A), said differential carrier comprising a casing portion having at least one opening for mounting sideshaft gears and differential gears;
wherein said sideshaft gears comprise crown gears rotatably held on said axis of rotation (A) when mounted in said differential carrier;
wherein said differential gears comprise spur gears rotating in sync with said differential carrier by way of a journal passing through radial through apertures formed in said casing portion, said differential gears engaging said sideshaft gears;
wherein said opening comprises a polygon opening having an axial length (L1) greater than a diameter of said differential gears and a circumferential extension (L2) greater than a smallest outer diagonal line of said sideshaft gears.

18. A differential assembly as described in claim wherein said opening comprises:
   a base face;
   two side faces; and
   two end faces extending at an angle relative to said axis of ration.

19. A differential assembly as described in claim 17, wherein said axial length (L1) is approximately 1.1 or less times an outer diameter (D2) of said differential gears.

20. A differential assembly as described in claim 17, wherein said circumferential extension (L2) is approximately 1.1 or less times an outer diameter (D1) of said sideshaft gears.

* * * * *

UNITED STATES PATENT AND TRADEMARK OFFICE
CERTIFICATE OF CORRECTION

PATENT NO.        : 8,152,680 B2
APPLICATION NO.   : 11/915572
DATED             : April 10, 2012
INVENTOR(S)       : Werner Krude et al.

It is certified that error appears in the above-identified patent and that said Letters Patent is hereby corrected as shown below:

At column 7, claim 4, line 67, change ~~Said~~ to <u>said</u>.

At column 9, claim 18, line 4, after the word claim please add <u>17,</u>.

Signed and Sealed this
Twenty-first Day of August, 2012

David J. Kappos
*Director of the United States Patent and Trademark Office*